US011157894B2

(12) United States Patent
Adari

(10) Patent No.: US 11,157,894 B2
(45) Date of Patent: Oct. 26, 2021

(54) CONTACTLESS TRANSACTION SYSTEM AND METHOD THEREOF USING CONTACTLESS TRANSACTION CARD

(71) Applicant: Swarna Kumari Adari, Visakhapatnam (IN)

(72) Inventor: Swarna Kumari Adari, Visakhapatnam (IN)

( * ) Notice: Subject to any disclaimer, the term of this patent is extended or adjusted under 35 U.S.C. 154(b) by 0 days.

(21) Appl. No.: 17/048,597

(22) PCT Filed: Sep. 24, 2018

(86) PCT No.: PCT/IB2018/057364
§ 371 (c)(1),
(2) Date: Oct. 18, 2020

(87) PCT Pub. No.: WO2019/202374
PCT Pub. Date: Oct. 24, 2019

(65) Prior Publication Data
US 2021/0158332 A1 May 27, 2021

(30) Foreign Application Priority Data
Apr. 18, 2018 (IN) .............................. 201841014749

(51) Int. Cl.
*G06Q 20/34* (2012.01)
*G06Q 20/38* (2012.01)
*G06Q 20/40* (2012.01)

(52) U.S. Cl.
CPC ......... *G06Q 20/352* (2013.01); *G06Q 20/385* (2013.01); *G06Q 20/40145* (2013.01)

(58) Field of Classification Search
None
See application file for complete search history.

(56) References Cited

U.S. PATENT DOCUMENTS

| | | | | |
|---|---|---|---|---|
| 6,863,220 B2 * | 3/2005 | Selker | ................ | G06K 19/0716 235/451 |
| 7,284,692 B1 * | 10/2007 | Douglass | ............. | G06Q 20/352 235/379 |
| 2013/0194075 A1 * | 8/2013 | Dressel | ................ | G06K 7/0008 340/10.1 |
| 2016/0171482 A1 * | 6/2016 | Muncey | ............. | G06K 19/0702 705/44 |

* cited by examiner

*Primary Examiner* — Kristy A Haupt

(57) ABSTRACT

The present invention relates generally to transaction cards, and more particularly to contactless transaction system and method thereof using contactless transaction card. Embodiments of the present disclosure provide a user-friendly system and method that provides a system and method to perform financial transaction at ATM and/or POS centers without inserting or tapping the card. In an embodiment, the objective of the present disclosure is to perform financial transactions at ATM's without inserting or tapping the bank card using Mid-Range Communication (MFC) technology.

10 Claims, 5 Drawing Sheets

CONTACTLESS TRANSACTION SYSTEM AND METHOD THEREOF USING CONTACTLESS TRANSACTION CARD

TECHNICAL FIELD

The present invention relates generally to transaction cards, and more particularly to contactless transaction system and method thereof using contactless transaction cards.

BACKGROUND

The background description includes information that may be useful in understanding the present invention. It is not an admission that any of the information provided herein is prior art or relevant to the presently claimed invention, or that any publication specifically or implicitly referenced is prior art.

Contactless transaction initiation is often performed with a "smart" card. Such a card typically includes radio-frequency identification ("RFID") components for contactless communication with a point-of-sale device, and a magnetic stripe that permits the card also to be used in a conventional magnetic-stripe card reader. The information communicated via the RFID components is generally similar or identical to the information recorded on the magnetic stripe. Payment systems that use contactless cards are generally restricted to providing a mechanism for a payment channel. In some systems, payment requests are routed through a conventional debit or credit authorization network, while in other system, payment requests are processed offline by the card, which includes a "stored value" account balance. These offline cards are sometimes referred to in the art as "electronic wallets," "e-wallets," "electronic purses," or "e-purses".

Other types of stored-value cards, also referred to or otherwise sold as gift cards, are typically associated with a centralized and remote stored-value account. Such cards may be contactless, and in some instances, may be relatively simple plastic cards with magnetic stripes. In any instance, the remote account is charged when the card is used through an exchange of information over a network, and can often be replenished by the cardholder or a third party. When the card is used, an account number comprised by the card permits access to the account. These cards also typically provided only a single payment channel, with all payment requests being directed to the remote account that stores the account balance.

Transaction cards and merchant POIs have evolved over the years to now include what are sometimes referred to as "contactless" transaction cards. These contactless transaction cards may include a transaction card having contactless technology, a key fob programmed with contactless technology, or a mobile phone programmed with contactless technology. Such contactless transaction cards are able to communicate with a merchant's contactless point-of sale device. For example, MasterCard® has a service called MasterCard PayPass®, which is a "contactless" way to pay a merchant. A simple tap of your contactless card, key fob, or mobile phone at the merchant's contactless point-of-sale device (or placing the contactless card in close proximity to the POS device) is all it takes to pay at checkout. The contactless card is capable of wirelessly transmitting account data to the point-of-sale device.

It is observed that, currently most of the bank cards are integrated with RFID chips inside so as to enable that card to perform wireless transactions (NFC technology) at merchant sites (at POS). However, customers need to take the card out manually form wherever it is kept, for example in wallet or pocket, and need to place/tap the card near NFC device to enable/active the transactions. Further, such NFC technology is also not well developed at ATM's to do cash withdrawals and other bank transactions through ATM.

SUMMARY

These above disclosed needs are successfully met via the disclosed system and method. According to various embodiments, a contactless transaction system and method is disclosed.

An aspect of the present disclosure relates to a contactless transaction system having a transaction card and a reader device. The transaction card includes one or more radio frequency identification (RFID) tag to transmit RFID signals. The reader device includes one or more transmitters to transmit reader device signals. The reader device signals are received by said transaction card and said RFID signals are received by said reader device.

In an aspect, the reader device, upon detection of said RFID signals for a pre-determined time duration, is configured to retrieve details associated with said RFID tag, and automatically display, on one or more user interfaces of said reader device, information associated with said transaction card.

In an aspect, the reader device, upon automatically displaying information associated with the transaction card, receives authentication information on said one or more user interfaces. In another aspect, the authentication information is a PIN pre-defined for said transaction card. In yet another aspect, authentication information is biometric information pre-defined for said transaction card.

In an aspect, the RFID tag includes a secure chip having a secure chip identifier and an antenna, and wherein an alias code is pre-provisioned on the secure chip.

In an aspect, the transaction card includes an operation switch or a binary switch to enable and disable transmission of said RFID signals. Instead of slide switch, we can also have binary switch (works as similar to number lock) 1 for enable and 0 for disable the wireless feature.

In an aspect, the reader device retrieves details of an RFID tag each associated with one or more transaction cards.

In an aspect, the transaction card is a debit card or a credit card.

In an aspect, the reader device is an automated teller machine (ATM) or a point of sale (POS).

In an aspect, the reader device signal and RFID signal comprise of data signals.

An aspect of the present disclosure relates to a method for contactless transaction. The method can include the steps of transmitting, by a transaction card having one or more radio frequency identification (RFID) tag, RFID signals, wherein said transaction card comprises an operation switch to enable and disable transmission of said RFID signals; transmitting, by a reader device having one or more transmitters, reader device signals, wherein said reader device signals are received by said transaction card and said RFID signals are received by said reader device; retrieving, by said reader device, upon detection of said RFID signals for a predetermined time duration, details associated with said RFID tag; and displaying automatically, on one or more user interfaces of said reader device, information associated with said transaction card.

The present invention relates generally to transaction cards, and more particularly to contactless transaction system and method thereof using contactless transaction card at ATM and/or POS (Point of Sale). The present disclosure provides a user-friendly interface to perform financial transaction at ATM centers without inserting or tapping the card. In an embodiment, the objective of the present disclosure is to perform financial transactions at ATM's without inserting or tapping the bank card using Mid-Range Communication (MFC) technology.

In an exemplary embodiment, the conventional ATM's are provided with a system and method to search for the bank cards (whether they are in customers pocket or wallet) using Mid-Range communication (MFC) technology. Once the ATM detects one or more cards in user's pocket or wallet using MFC technology, the respective bank names issued such cards appears on the ATM screen (display).

In an exemplary embodiment, both cards and ATM machines are provided with MFC communication modules to communicate with each other. Due to this, the ATM machine will detect the cards having MFC module, whenever in pre-defined range and display the card information with respective bank name on the ATM screen.

In an exemplary embodiment, upon display of various cards using MFC technology, the user select the respective bank card, for which transaction is sought to made and enter the associated PIN or authenticate with biometrics or authenticate with OTP (One Time Password).

In an exemplary embodiment, once authenticated then the user can choose the appropriate financial transaction option and can follow the normal procedure. Once the transaction is completed, the ATM may be configured to again display all the banks names which are detected earlier. Now user can choose card details of other banks on the ATM screen (display) to do another transaction or user can choose exit option from the ATM.

In an exemplary embodiment, user can exit from the ATM and when travelled beyond the pre-defined MFC range, the ATM will automatically close all access to previous detected cards and display home screen.

In an exemplary embodiment, bank cards may also be provided with a small on or off switch which the users can switch to enable wireless detection of the cards to prevent unnecessary use of card.

Consideration is now being given to ways of enhancing interoperability of electronic payment devices that are used in contactless electronic payment systems. Attention is directed to reducing variations in card and reader properties consistent with commonly accepted Standards. In particular, attention is directed to improving specification compliance procedures to enhance interoperability.

It may be appreciated that the RFID tag for transmitting RFID signals are merely used for exemplary and illustrative purposes. Any tags such as but not limited to NFC tags or any wireless tags may also be used instead of RFID tags in the present invention and accordingly the associated signal may be transmitted. Accordingly, based on the usage of tags a corresponding the reader device may be used for receipt of the transmitted signals.

It may be further appreciated that, debit card or credit card are merely used for exemplary and illustrative purposes. Any such cards which are used for financial transaction can be utilized in the invention to perform contactless transaction.

It may be further appreciated that, the reader device is an automated teller machine (ATM) or a point of sale (POS) are merely used for exemplary and illustrative purposes. Any such reader devices which are used for financial transaction can be utilized in the invention to perform contactless transaction.

Further features of the invention, its nature and various advantages will be more apparent from the accompanying drawings and the following detailed description.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION

Figure 1:
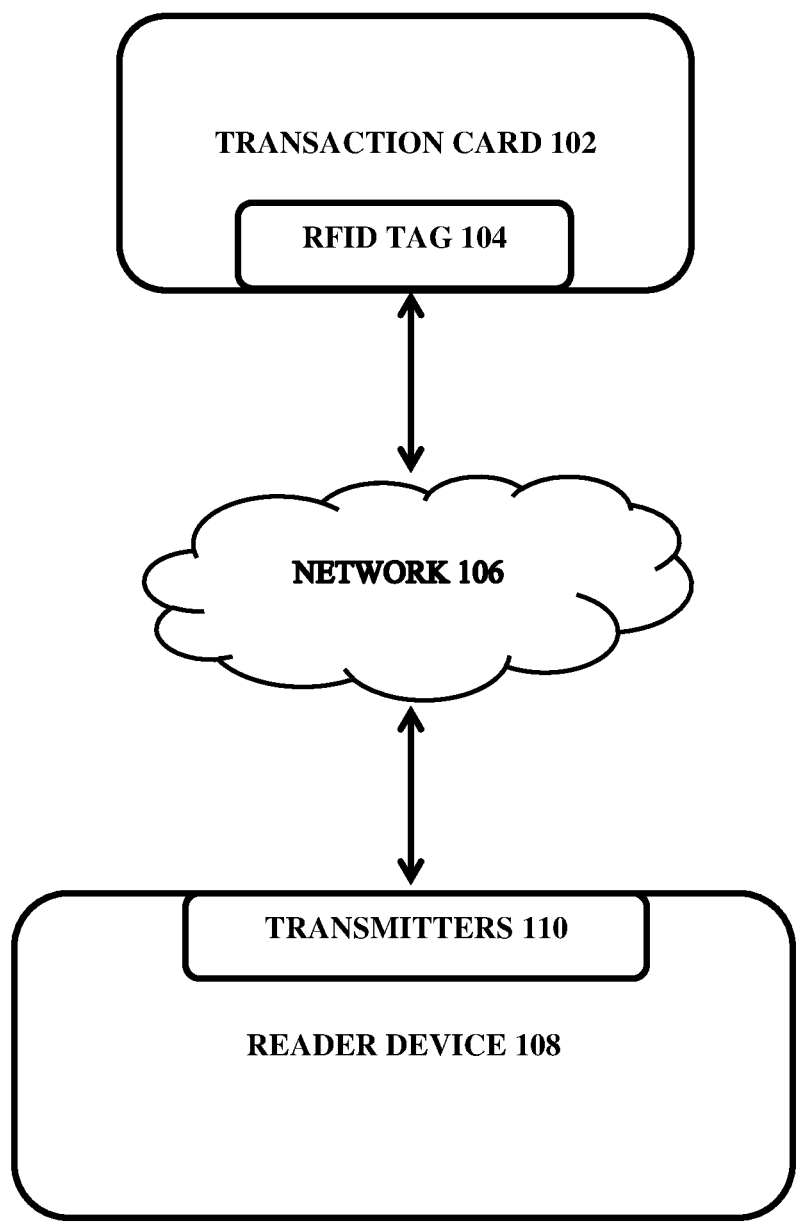
FIG. 1 illustrates a network implementation of the proposed contactless transaction system, in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present invention relates generally to transaction cards, and more particularly to contactless transaction system and method thereof using contactless transaction card.

Embodiments of the present disclosure provide a user-friendly system and method that provides a system and method to perform financial transaction at ATM centers without inserting or tapping the card. In an embodiment, the objective of the present disclosure is to perform financial transactions at ATM's without inserting or tapping the bank card using Mid-Range Communication (MFC) technology.

In an exemplary embodiment, the conventional ATM's are provided with a feature to search for the bank cards (whether they are in customers pocket or wallet) which are having this technology. Once the ATM detects one or more cards in MFC, the respective bank names appears on the ATM screen (display).

In an exemplary embodiment, upon display of various cards in MFC, the user may select the respective bank and enter the associated PIN or authenticate with biometrics.

In an exemplary embodiment, once authenticated then the user can choose the appropriate financial transaction option and can follow the normal procedure. Once the transaction is completed, the ATM may be configured to again display all the banks names which are detected earlier. Now user can choose other banks/details of other banks to do the other transaction or user can just exit from the ATM.

In an exemplary embodiment, once the user exits from ATM and goes beyond the pre-defined MFC, the ATM may stop the searching process and it will display the bank home screen automatically.

FIG. 1 illustrates a network implementation of the proposed contactless transaction system, in accordance with an exemplary embodiment of the present disclosure.

An aspect of the present disclosure relates to a contactless transaction system having a transaction card 102 and a reader device 108. The transaction card 102 includes one or more radio frequency identification (RFID) tags 104 to transmit RFID signals. The reader device 108 includes one or more transmitters 110 to transmit reader device signals. The reader device 108 signals are received by said transaction card 102 and said RFID signals are received by said reader device 108.

In an aspect, the reader device, upon detection of said RFID signals for a pre-determined time duration, is configured to retrieve details associated with said RFID tag 104, and automatically display, on one or more user interfaces (not shown) of said reader device 108, information associated with said transaction card 102.

In an aspect, the reader device 108, upon automatically displaying information associated with the transaction card 102, receives authentication information on said one or more user interfaces. In another aspect, the authentication information is a PIN pre-defined for said transaction card 102. In yet another aspect, authentication information is biometric information pre-defined for said transaction card 102.

In an aspect, the RFID tag 104 includes a secure chip having a secure chip identifier and an antenna, and wherein an alias code is pre-provisioned on the secure chip.

In an aspect, the transaction card 102 includes an operation switch to enable and disable transmission of said RFID signals.

In an aspect, the reader device 108 retrieves details of an RFID tag each associated with one or more transaction cards.

In an aspect, the transaction card 102 is a debit card or a credit card.

In an aspect, the reader device 108 is an automated teller machine (ATM) or a point of sale (POS).

In an aspect, the reader device signal and RFID signal comprise of data signals.

Embodiments of the present disclosure provide a user-friendly system and method that provides a system and method to perform financial transaction at ATM centers without inserting or tapping the card. In an embodiment, the objective of the present disclosure is to perform financial transactions at ATM's without inserting or tapping the bank card using Mid-Range Communication (MFC) technology/network 106.

In an exemplary embodiment, the conventional ATM's are provided with a feature to search for the bank cards (whether they are in customers pocket or wallet) which are having the MFC technology. Once the ATM detects one or more cards in MFC, the respective bank names appears on the ATM screen (display).

In an exemplary embodiment, upon detection of various cards in MFC, the user may select the respective bank and enter the associated PIN or authenticate with biometrics or authenticate with any other security way like OTP (One Time Password).

In an exemplary embodiment, once authenticated then the user can choose the appropriate financial transaction option and can follow the normal procedure. Once the transaction is completed, the ATM may be configured to again display all the banks names which are detected earlier. Now user can choose other banks/details of other banks to do the other transaction or user can just exit from the ATM.

In an exemplary embodiment, once the user is exits from ATM and goes beyond the pre-defined MFC, the ATM may stop the searching process and it will display the bank home screen automatically.

In an exemplary embodiment, bank cards may also be provided with a small on or off switch which the users can switch to enable wireless detection of the cards at the ATM. If they switched off then the ATM will not detect the card and will not display the same on the screen.

In one implementation, the network 106 can be a wireless network, a wired network or a combination thereof. The network 106 can be implemented as one of the different types of networks, such as intranet, local area network (LAN), wide area network (WAN), the internet, and the like. Further, the network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 104 can include a variety of network devices, including routers, bridges, servers, computing devices, storage devices, and the like.

Figure 2:
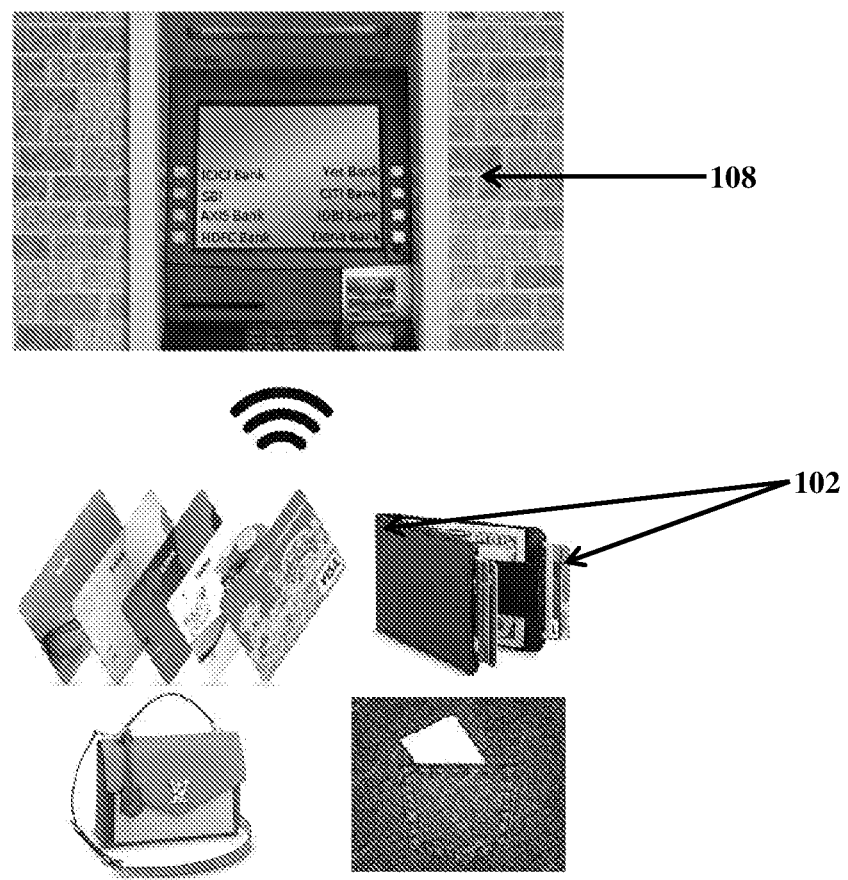
FIGS. 2-3 illustrate an exemplary overall architecture of the proposed system to elaborate its working, in accordance with an exemplary embodiment of the present disclosure.
Figure 3:
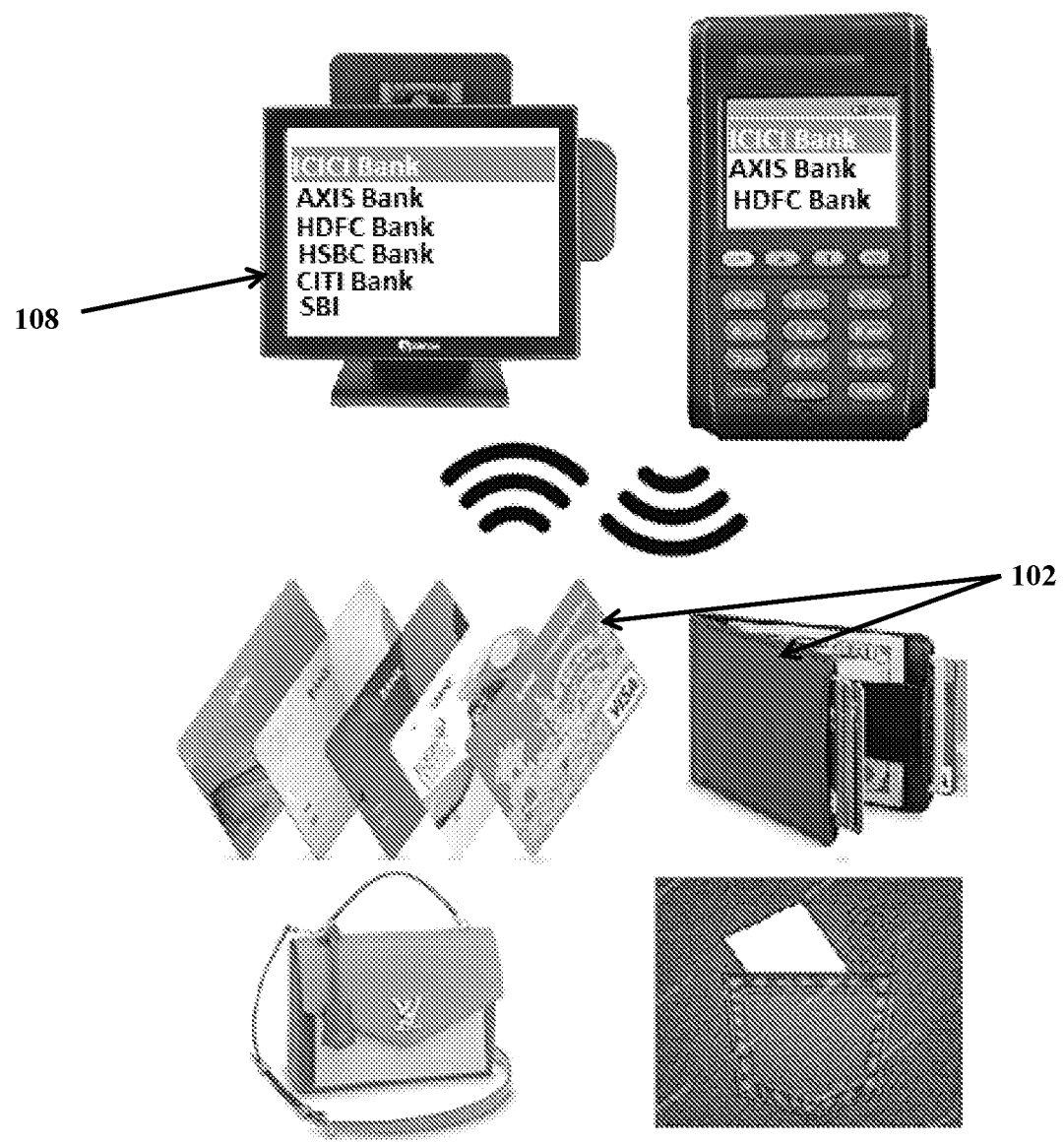

In an example, as shown in FIGS. 2-3, if the user has 5 different bank cards, using the proposed system and method, the user can put all your cards in his/her pocket or wallet or any location convenient to him/her. Once the user enters into the ATM and the cards are enabled for wireless detection, the ATM will search for all the cards (which are enabled with this wireless technology) whether they are in your pocket or wallet within 1 meter to 3 meters distance (MFC). If ATM retrieves any card information successfully then the bank name will be displayed automatically on the ATM screen. Upon displaying the details of the bank, the user can just select the particular bank name and enter the PIN and then continue the desired transaction. Once is the transaction completed, the ATM will go to the main screen which may display the bank names screen. Now user can choose other banks details to do the other transaction or user can just exit from the ATM. Once the user is existed from ATM, the ATM may stop searching process and it will display the bank home screen automatically.

In an exemplary embodiment, the invention include a transaction card assembly that includes a transaction card having a contactless integrated circuit that communicates with a card reader/NFC receiver device installed at ATM's or POS machines.

In one embodiment, the reader device 108 may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the reader device 108 to interact with a user directly or through the client devices. Further, the I/O interface may enable the reader device 108 to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules, routines, programs, objects, components, data structures, etc., which perform particular tasks or implement particular abstract data types.

Figure 4:
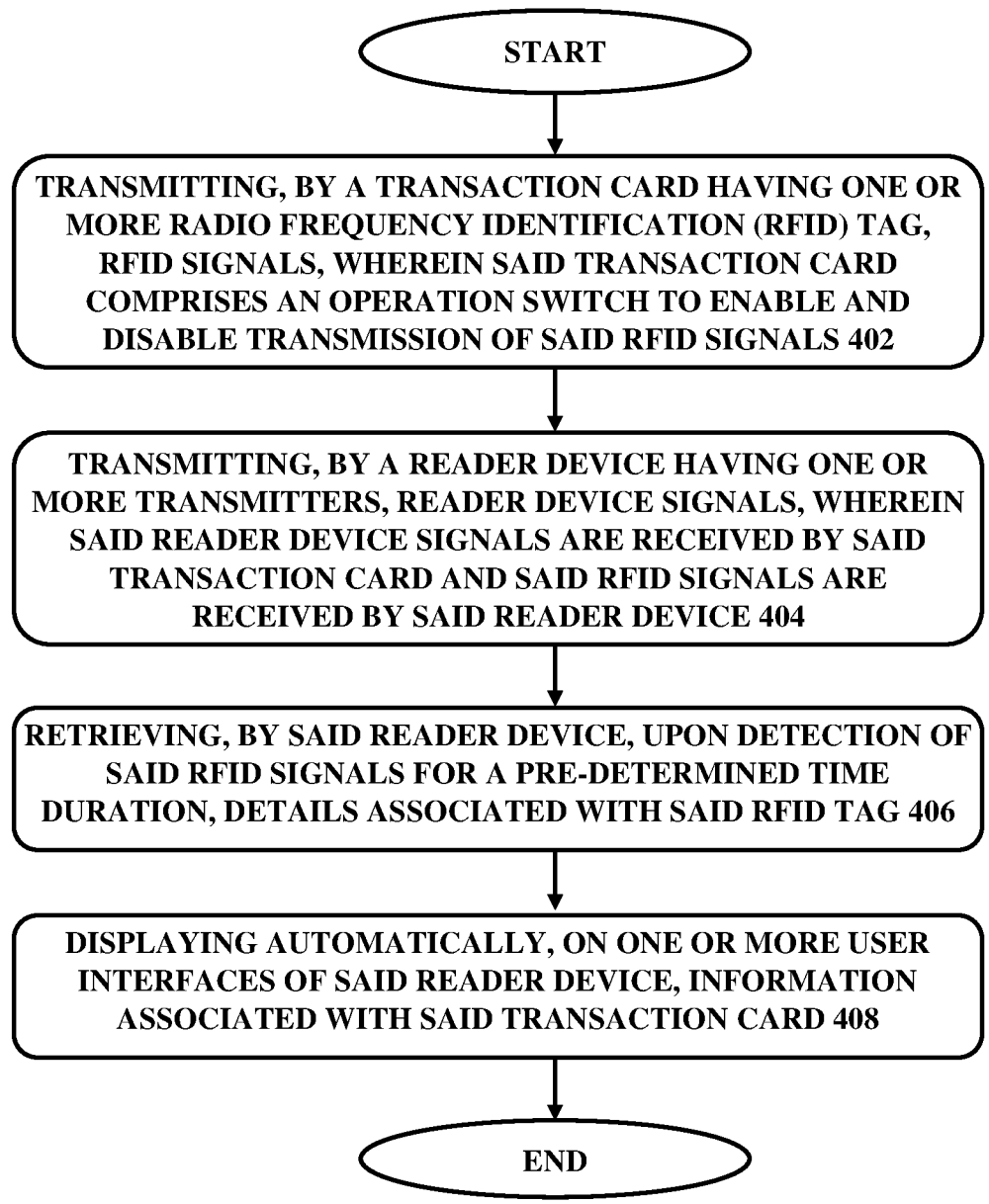
FIG. 4 illustrate a method to elaborate working of the proposed contactless transaction system, in accordance with an exemplary embodiment of the present disclosure.

FIG. 4 illustrates an exemplary flow diagram representing method performed by the proposed system, in accordance with an exemplary embodiment of the present disclosure. The method may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above proposed system.

At block 402, a transaction card having one or more radio frequency identification (RFID) tag transmits RFID signals. The transaction card includes an operation switch to enable and disable transmission of said RFID signals.

Figure 5:
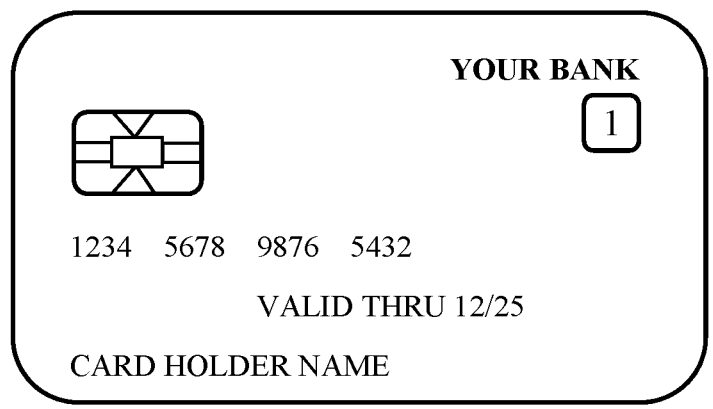
FIG. 5 illustrates the financial transaction card with physical slide switch.

In an exemplary embodiment, bank cards may also be provided with a small on or off switch which the users can switch to enable wireless detection of the cards at the ATM. If they switched off then the ATM will not detect the card and will not display the same on the screen. This embodiment is illustrated in FIG. 5.

At block 404, a reader device having one or more transmitters transmits reader device signals, wherein said reader device signals are received by said transaction card and said RFID signals are received by said reader device.

At block 406, said reader device, upon detection of said RFID signals for pre-determined time duration, retrieves details associated with said RFID tag.

At step 408, details associated with said RFID tag and/or information associated with said transaction card is displayed automatically, on one or more user interfaces of said reader device.

In an exemplary embodiment, the transaction card also includes a contactless integrated circuit chip, which may include a wireless transmitter and/or receiver for exchanging information with a transaction card reader. The chip may include an antenna for transmitting and receiving information associated with the transaction on a modulated RF carrier signal. The contactless IC chip may be designed to conform to ISO/IEC standards for contactless integrated circuit cards and proximity cards, including the ISO/IEC 14443 standard, and/or the ISO/IEC 15693 standard, among others.

In an exemplary embodiment, the transaction may be conducted by positioning the transaction card a proximate distance (MFC/pre-determined/pre-defined distance) from the point of sale device capable of receiving a signal from the card. Embodiments also include having the point of sale device transmit a signal to the card, such as a handshake signal instructing the card to start transmitting data that can be used to process the transaction. The POS device may also transmit signals with information about the transaction or debit account associated with the card for storage on the card. For example, when the transaction card conforms to the ISO/IEC 14443 standard, a POS device (not shown) may send and receive messages about the transaction via a modulated RF field that has a carrier frequency of 13.56 MHz.

It will be appreciated that the data card may comprise a variety of other shapes. The transaction card, for example, may have any rectangular, circular, semi-circular, elliptical, polygonal, etc., shape. The shape of the card may also be indicative of the business of a merchant, service provider, organization, etc. associated with transactions made with the card. For example, the card may have the shape of a store or restaurant front, houses, shoes, athletic equipment (e.g., football, baseball, tennis racket, hockey stick, etc.), food products (e.g., fruits, vegetables, pizza, donuts, hamburgers, etc.) beverage products, cars, animals (e.g., pets, livestock, etc.), cartoon characters, and consumer goods, among other shapes.

The present transaction cards may include a variety of sizes, including but not limited to, standard sized credit cards such as the 3 ⅜ inches by 2 ⅛ inches by 0.03 inches thick conventional CR-80 type card. Embodiments, for example, include transaction cards with a conventional rectangular shape, and dimensions of less than 3 ⅜ inches in width and less than 2 ⅛ inches in height, such as a minicard. The assemblies may also contain larger than standard-sized cards, provided the cards have a size that is practical for being carried in a purse, wallet, pants pocket, etc.

The transaction cards of the present invention may also have additional elements for transaction processing. These may include indicia on the transaction card such as alpha-numeric characters that uniquely identify a transaction account associated with the card. They may also include a magnetic stripe to store card information such as a card number, which can be read by a magnetic card reader at a conventional POS terminal. The card may further include a bar code that has card information readable by a bar code scanner. In addition, the card may have a signature strip that can be signed by the cardholder.

The transaction card may have advertising, branding, instructional information and other indicia. For example, the sheets may contain promotional information, trademarks, logos, graphics, website addresses, etc., associated with the vendors, merchants and/or service providers that sponsor or accept the transaction card. The indicia may be confined exclusively to the sheet portion of the transaction card assembly, or it may overlap both the sheet and the transaction card. For example, a focal point of a graphic may be centered on the transaction card while background scenery spills over onto the surrounding sheet, providing a larger sized display of the graphic on the overall card.

Indicia may also be presented on opposite sides of the transaction card assembly. For example, the assembly may have a display side for promotional graphics and logos, and an instruction side that is opposite the display side that has instructional information, terms and conditions, etc. for using the transaction card, as well as information on how to remove the card from the card assembly. The sheet portion of the instruction side may also contain identification indicia such as a set of alpha-numeric characters and/or a bar code that uniquely identifies the assembly. The indicia may be included as part of the information used to activate the transaction card.

Electronics that permits contactless transactions is also added to the transaction card. The electronics may be an integrated circuit chip that includes an electromagnetic transmitter and/or receiver for wirelessly sending and/or receiving transaction information.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Although the proposed system has been elaborated as above to include all the main modules, it is completely possible that actual implementations may include only a part of the proposed modules or a combination of those or a division of those into sub-modules in various combinations across multiple devices that can be operatively coupled with each other, including in the cloud. Further the modules can be configured in any sequence to achieve objectives elaborated. Also, it can be appreciated that proposed system can be configured in a computing device or across a plurality of computing devices operatively connected with each other, wherein the computing devices can be any of a computer, a laptop, a smartphone, an Internet enabled mobile device and the like. All such modifications and embodiments are completely within the scope of the present disclosure.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

ADVANTAGES OF THE PRESENT INVENTION

The system and method according to the present invention requires no need to insert/swipe/Tap our cards at ATM centre (it may be appreciated that, this technology is not only for ATM but for any transaction device).

The system and method according to the present invention requires no need to worry about the security because we need to enter the PIN for the transactions.

The system and method according to the present invention requires only few information is available on the RFID device. So no need of worrying about hacking the user/bank information.

The system and method according to the present invention enable multiple bank operations can do in the single ATM without inserting card again and again.

The system and method according to the present invention provides Dynamic search and display the bank names on the ATM screen.

The system and method according to the present invention provides On-Off switch to the cards that enable or disable this feature by the user convenience.

The system and method according to the present invention saves lot of time.

The system and method according to the present invention requires no need to take our cards outside from our pockets/wallets/handbags etc.

The system and method according to the present invention work using RFID technology on the cards and the ATM itself. The cards has RFID built-in technology and additional a button to switch on and off.

The system and method according to the present invention requires convention ATM to have dedicated circuitry to detect the presence of cards in the range. The software of ATM machine will be updated remotely. However hardware changes need to be change at the location of the ATM.

The system and method according to the present invention, in case of open ATM like available in USA, helps to detect the information associated with the card only when they are in MFC range or the signal is identified for a particular pre-defined duration of time.

I claim:

1. A contactless transaction system, comprising:
   one or more transaction cards (102) having one or more radio frequency identification (RAID) tags (104) configured to transmit RFID signals;
   a reader device (108) having one or more transmitters (110) configured to transmit reader device signals, wherein said reader device signals are received by said atleast one transaction card (102) and said RFID signals are received by said reader device (108);
   the reader device determines the number of transaction cards having one or more RFID tags and respective bank information associated with one or more transaction cards;
   wherein said reader device (102), upon detection of said RFID signals from one or more transaction cards for a pre-determined time duration, is configured to retrieve bank details associated with said RFID tags (104), and automatically display on one or more user interfaces of said reader device (108), one or more bank information associated with said transaction card (102) for selection of bank's transaction card for financial transaction without taking the cards out of user's pocket or wallet.

2. The contactless transaction system as claimed in claim 1, wherein said reader device (108), upon automatically displaying information associated with the transaction card (102), is configured to receive, on said one or more user interfaces, an authentication information after selection of respective bank's transaction card.

3. The contactless transaction system as claimed in claim 2, wherein authentication information is a PIN pre-defined for said transaction card.

4. The contactless transaction system as claimed in claim 2, wherein authentication information is biometric information pre-defined for said transaction card (102).

5. The contactless transaction system as claimed in claim 1, wherein the RFID tag (104) comprises a secure chip having a secure chip identifier and an antenna, and wherein an alias code is pre-provisioned on the secure chip.

6. The contactless transaction system as claimed in claim 1, wherein said transaction card (102) comprises an operation switch or a binary switch to enable and disable transmission of said RFID signals.

7. The contactless transaction system as claimed in claim 1, wherein said reader device (108) is configured to retrieve details of an RFID tag (104) each associated with one or more transaction cards (102).

8. The contactless transaction system as claimed in claim 1, wherein said transaction card (102) is a debit card or a credit card or any transaction card.

9. The contactless transaction system as claimed in claim 1, wherein said reader device (108) is an automated teller machine (ATM) or a point of sale (POS) or any transaction device.

10. A method for contactless transaction, comprising:
    transmitting, by one or more transaction cards (102) having one or more radio frequency identification (RFID) tags (104), RFID signals, wherein said transaction card (102) comprises an operation switch to enable and disable transmission of said RFID signals;
    transmitting, by a reader device (108) having one or more transmitters (110), reader device signals, wherein said reader device signals are received by said one or more transaction cards (102) and said RFID signals are received by said reader device (108); determining the number of cards having one or more RFID tags and the respective bank information associated with one or more transaction cards; retrieving, by said reader device (108), upon detection of said RFID signals for a pre-determined time duration, details associated with said RFID tags (104); and displaying automatically, on one or more user interfaces of said reader device (108), bank information associated with said one or more transaction card (102) for selection of bank's transaction card for financial transaction without taking the cards out of user's pocket or wallet.

* * * * *